US009120192B2

(12) United States Patent
Krieg

(10) Patent No.: US 9,120,192 B2
(45) Date of Patent: Sep. 1, 2015

(54) DUAL-SPINDLE MACHINING APPARATUS

(75) Inventor: Martin Krieg, Schwaebisch Gmuend (DE)

(73) Assignee: EMAG HOLDING GMBH, Salach (DE)

( * ) Notice: Subject to any disclaimer, the term of this patent is extended or adjusted under 35 U.S.C. 154(b) by 661 days.

(21) Appl. No.: 13/431,173

(22) Filed: Mar. 27, 2012

(65) Prior Publication Data

US 2013/0255066 A1 Oct. 3, 2013

(51) Int. Cl.
| | |
|---|---|
| *B23Q 11/08* | (2006.01) |
| *B23Q 7/00* | (2006.01) |
| *B23B 3/10* | (2006.01) |
| *B23B 3/30* | (2006.01) |
| *B23B 25/04* | (2006.01) |
| *B23B 9/12* | (2006.01) |
| *B23Q 39/02* | (2006.01) |
| *B23Q 11/00* | (2006.01) |

(Continued)

(52) U.S. Cl.
CPC ............... *B23Q 39/024* (2013.01); *B23B 3/10* (2013.01); *B23B 3/162* (2013.01); *B23B 3/30* (2013.01); *B23B 13/04* (2013.01); *B23B 25/04* (2013.01); *B23Q 7/00* (2013.01); *B23Q 11/0053* (2013.01); *B23Q 11/0067* (2013.01); *B23Q 11/08* (2013.01); *B23Q 11/0825* (2013.01); *B23Q 11/0891* (2013.01); *B23Q 39/028* (2013.01); *B23Q 2039/002* (2013.01); *B23Q 2039/004* (2013.01); *B23Q 2039/008* (2013.01); *B23Q 2707/003* (2013.01); *Y10S 29/056* (2013.01); *Y10S 29/094* (2013.01); *Y10S 82/901* (2013.01); *Y10T 29/5109* (2015.01); *Y10T 29/5124* (2015.01); *Y10T 82/2511* (2015.01); *Y10T 82/2524* (2015.01)

(58) Field of Classification Search
CPC ............. B23Q 39/028; B23Q 11/0067; B23Q 11/0053; Y10S 82/901; Y10S 29/056; Y10S 29/06; Y10S 29/061; Y10S 29/079; Y10S 29/094; B23B 25/04; Y10T 82/2511; Y10T 82/2524; Y10T 29/5124; Y10T 82/16098
See application file for complete search history.

(56) References Cited

U.S. PATENT DOCUMENTS 3,366,012 A * 1/1968 Richter ......................... 409/134
5,364,210 A * 11/1994 Rutschle et al. ......... 29/DIG. 56
(Continued)

FOREIGN PATENT DOCUMENTS

DE 102012004709 B4 * 9/2013
EP 1711309 B1 4/2008
(Continued)

*Primary Examiner* — Erica E Cadugan
(74) *Attorney, Agent, or Firm* — Andrew Wilford

(57) ABSTRACT

A machining apparatus has a frame defining first and second upper machining stations horizontally offset from each other and first and second lower transfer stations underneath the first and second upper machining stations. First and second spindles have respective workpiece grabs and are displaceable vertically on the frame between upper positions in the respective machining stations and lower positions in the respective transfer stations. A workpiece conveyor extending through the transfer stations can transport workpieces into and out of the transfer stations. A holder carrying tools is displaceable horizontally on the frame between the machining stations. A chip deflector has first and second parts movable between catch positions underneath the respective first and second machining stations and parked positions not underneath the respective first and second machining stations.

8 Claims, 4 Drawing Sheets

(51) Int. Cl.
B23B 3/16 (2006.01)
B23B 13/04 (2006.01)
B23Q 39/00 (2006.01)

(56) References Cited

U.S. PATENT DOCUMENTS

| | | | |
|---|---|---|---|
| 5,699,598 A * | 12/1997 | Hessbruggen et al. | 29/27 C |
| 6,158,312 A * | 12/2000 | Link et al. | 82/122 |
| 6,547,497 B2 * | 4/2003 | Lof et al. | 29/DIG. 86 |
| 7,387,478 B2 * | 6/2008 | Anderson et al. | 29/DIG. 94 |
| 8,448,550 B2 * | 5/2013 | Hessbrueggen et al. | 82/129 |
| 8,661,950 B2 * | 3/2014 | Hessbrueggen et al. | 82/129 |
| 2012/0125165 A1 * | 5/2012 | Hessbrueggen et al. | 82/1.11 |
| 2013/0133488 A1 * | 5/2013 | Schuster | 82/121 |
| 2014/0079500 A1 * | 3/2014 | Boehringer | 409/134 |
| 2014/0326114 A1 * | 11/2014 | Hessbrueggen | 82/122 |

FOREIGN PATENT DOCUMENTS

| | | | |
|---|---|---|---|
| JP | 2007-268674 A | * | 10/2007 |
| WO | WO-87/03230 A1 | * | 4/1987 |

* cited by examiner

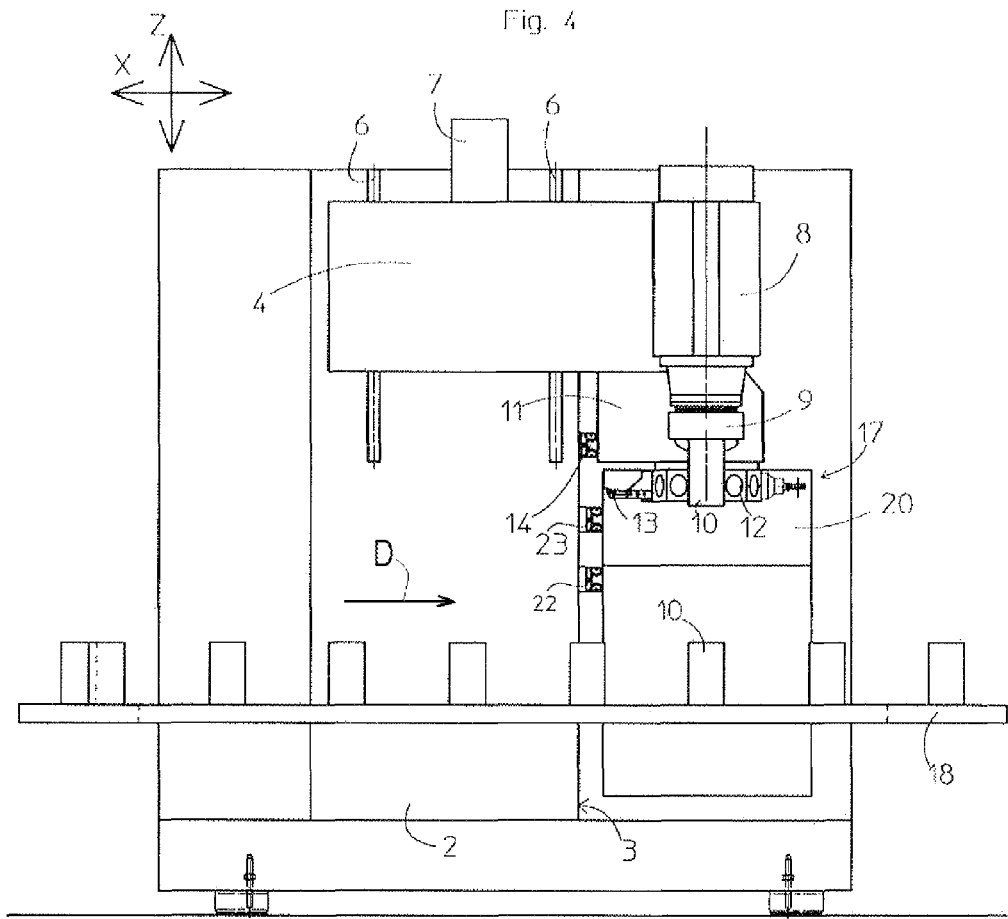

DUAL-SPINDLE MACHINING APPARATUS

FIELD OF THE INVENTION

The present invention relates to a machining apparatus. More particularly this invention concerns such an apparatus with two spindles and a method operating same.

BACKGROUND OF THE INVENTION

A typical dual-spindle machining apparatus has a frame defining first and second upper machining stations horizontally offset from each other and first and second lower transfer stations underneath the first and second upper machining stations. First and second spindles have respective workpiece grabs and are displaceable vertically on the frame between upper positions with the respective grabs in the respective machining stations and lower positions with the respective grabs in the respective transfer stations. A workpiece conveyor extends through the transfer stations for transporting workpieces into and out of the transfer stations so that the spindles can pick up unmachined workpieces from the respective transfer stations and set machined workpieces down in the respective transfer stations. A holder carrying tools is displaceable on the frame between the machining stations so that while a workpiece is being machined by one of the tools in one of the machining stations a workpiece can be loaded into or unloaded from the grab of the transfer station of the other of the machining stations.

Such a machining apparatus operates on the pendulum principle, machining the workpieces alternately in both spindles. While a workpiece is being machined in the one spindle, the other workpiece can be loaded. For short machining times, the pendulum principle is especially advantageous when the idle times are equal to or greater than the machining times.

EP 1 711 309 describes two workpiece spindles and two tool turrets comprising four numerically controlled axes for the purpose of reducing idle times. Loading is effected by means of two loading and unloading devices that are disposed on both sides of the work space.

Since however the chips of produced by such a machining apparatus operating on the pendulum principle are accumulated in alternating fashion at both spindles, they must stowed or shielded. Particularly in compact machines, there is only very little space for the chip guard. No matter what is done, some of them end up accumulating on the conveyors, entailing serious down time while everything is periodically cleaned.

OBJECTS OF THE INVENTION

It is therefore an object of the present invention to provide an improved dual-spindle machining apparatus and method of operating it.

Another object is the provision of such an improved dual-spindle machining apparatus and method of operating it that overcomes the above-given disadvantages, in particular that is simpler than the known dual-spindle turning machines, with compact construction and an improved chip guard protecting against chips exiting the work space.

A further object is to provide an improved method of operating a dual-spindle machine that not only is highly efficient, but that also allows virtually all the chips and debris generated by the machining operation and by the blow-clearing of the chucks holding the workpieces to be trapped and kept off the conveyors.

SUMMARY OF THE INVENTION

A machining apparatus has according to the invention a frame defining first and second upper machining stations horizontally offset from each other and first and second lower transfer stations underneath the first and second upper machining stations. First and second spindles have respective workpiece grabs and are displaceable vertically on the frame between upper positions with the respective grabs in the respective machining stations and lower positions with the respective grabs in the respective transfer stations. A workpiece conveyor extending through the transfer stations can transport workpieces into and out of the transfer stations so that the spindles can pick up unmachined workpieces from the respective transfer stations and set machined workpieces down in the respective transfer stations. A holder carrying tools is displaceable horizontally on the frame between the machining stations so that while a workpiece is being machined by one of the tools in one of the machining stations a workpiece can be loaded into or unloaded from the grab of the transfer station of the other of the machining stations. A chip deflector has first and second parts movable between catch positions underneath the respective first and second machining stations and parked positions not underneath the respective first and second machining stations and permitting the spindles to move vertically between the respective machining and transfer stations.

As provided in one advantageous aspect of the invention, a telescoping chip guard is associated with both workpiece spindles, which chip guard can optionally shield either one workpiece spindle, or both simultaneously if required.

BRIEF DESCRIPTION OF THE DRAWING

The above and other objects, features, and advantages will become more readily apparent from the following description, reference being made to the accompanying drawing in which:

FIG. 4 is an end view of the turning machine.

DETAILED DESCRIPTION

Figure 1:
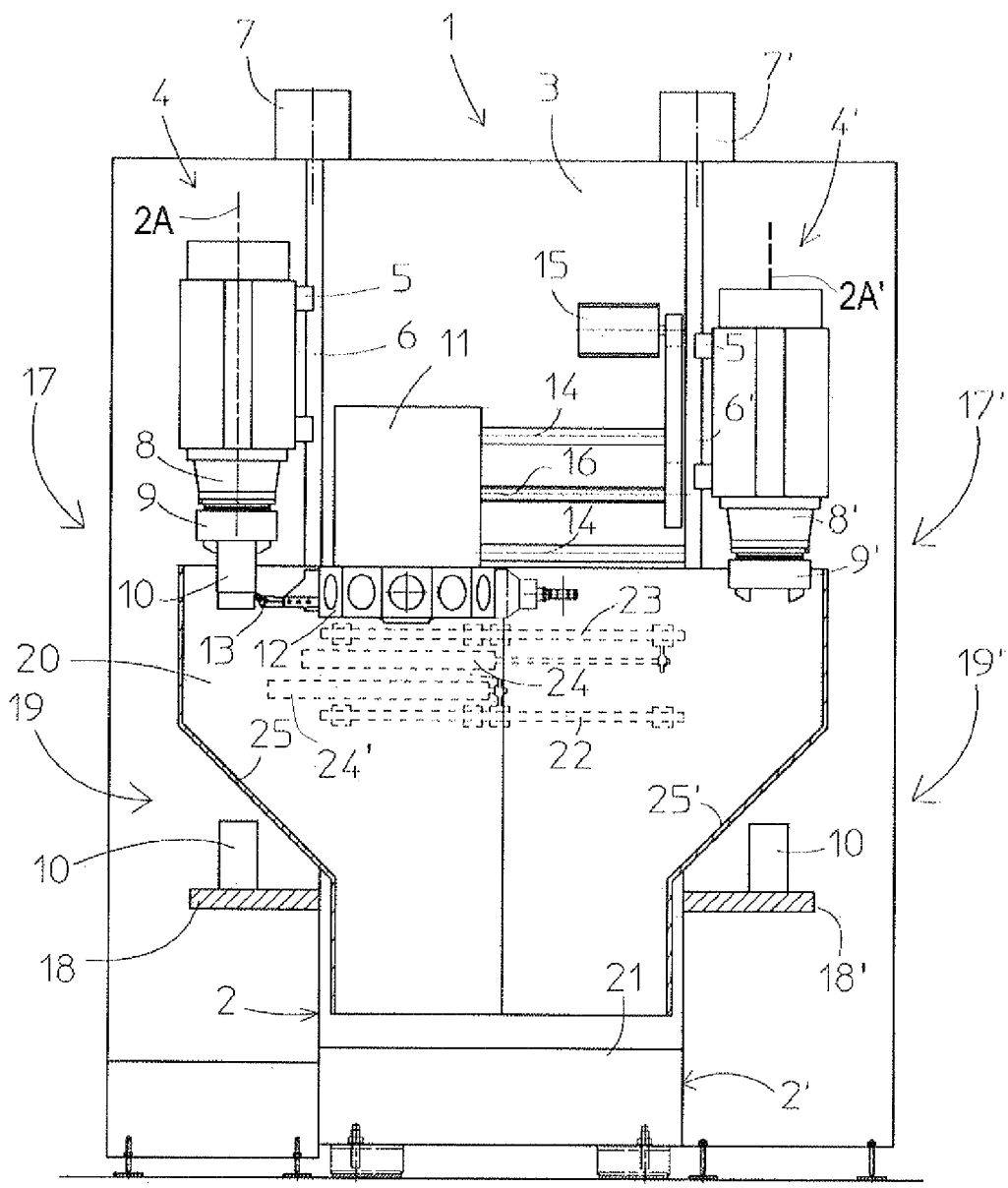
FIG. 1 is an elevational view from the operator side of a dual-spindle turning machine.

As seen in FIG. 1 a dual-spindle turning machine has a column-line frame 1 with vertical side walls 2 and 2' spanned by a vertical front wall 3. Spindle slides 4 and 4' have respective bases 5 and 5' movable on vertical guides 6 and 6' (Z axis) on the side walls 2 and 2'. The drive means is here constituted by respective motors 7 and 7' connected to the slide bases 5 and 5' by unillustrated recirculating-ball screws. In this regard reference is made to copending and commonly owned U.S. application Ser. No. 12/945,542 filed 12 Nov. 2010 and Ser. No. 13/302,022 filed 22 Nov. 2011, whose entire disclosures are herewith incorporated by reference.

The spindle slides 4 and 4' carry respective workpiece spindles 8 and 8' for rotation about respective axes 2A and 2A'. Chucks 9 and 9' for the workpieces 10 are mounted at the bottom of these spindles 8 and 8'. A carriage 11 carries a tool holder 12 for tools 13 and is movable horizontally (X axis) on guide rails 14 in the top region of the front wall 3. The carriage 11 is moved by recirculating-ball screws 16 by a motor 15.

The workpiece spindle 8 is situated a respective workpiece 10 in a machining station 17 and the tool 13 it carries is engaged with this workpiece 10. Respective conveyors 18 and 18' transport unmachined workpieces 10 in a direction D (FIG. 4) perpendicular to the plane of view of FIGS. 1-3 into respective loading stations 19 and 19' and then removes machined workpieces from these stations 19 and 19'. The stations 19 and 19' are advantageously directly underneath the machining stations 17 and 17' so that the spindles 8 and 8' can load and unload their chucks 9 and 9' simply by moving vertically along the respective guides 6 and 6'.

A chip guard 20 is funnel-shaped and is formed by two telescoping deflector plates 25 and 25' that can be moved horizontally perpendicular to the direction D along rails 22 and 23 on the front wall 3. The chips accumulating in the machining stations 17 and 17' can be deflected by the plates 25 and 25' into a collection bin 21, thereby protecting the conveyor 18 from falling chips and coolant. The deflector plates 25 and 25' can be moved individually as needed by means of separate actuating cylinders 24 and 24'. Both deflector plates 25 and 25' are underneath the respective stations 17 and 17' in the view of FIG. 1. While a workpiece is being machined in the station 17, the chuck 9' can for example be cleaned in machining station 17' by flushing or blowing. The chip guard 20 extends upward at its upper edge far enough so as to surround the tool holder 12 from below.

Figure 2:
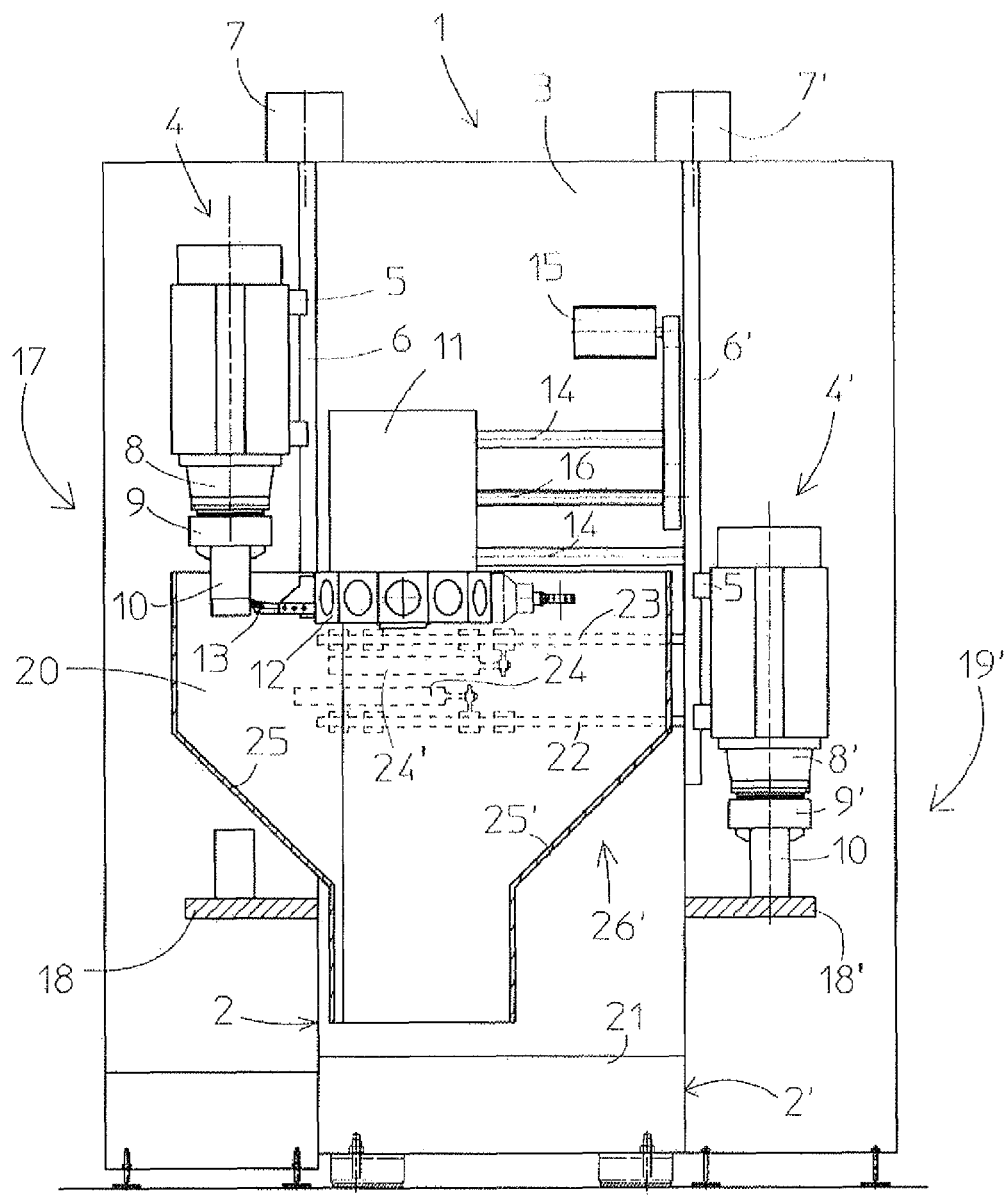
FIG. 2 shows the turning machine of FIG. 1 when loading the right-hand workpiece spindle.

FIG. 2 shows the turning machine of FIG. 1 when the spindle 8' is being loaded. The deflector plate 25' has been moved by its actuator/cylinder 24' to the left into a parked position 26', while the spindle 8' has been moved along guide 6' down to the respective lower loading station 19' to receive an unmachined workpiece 10.

Figure 3:
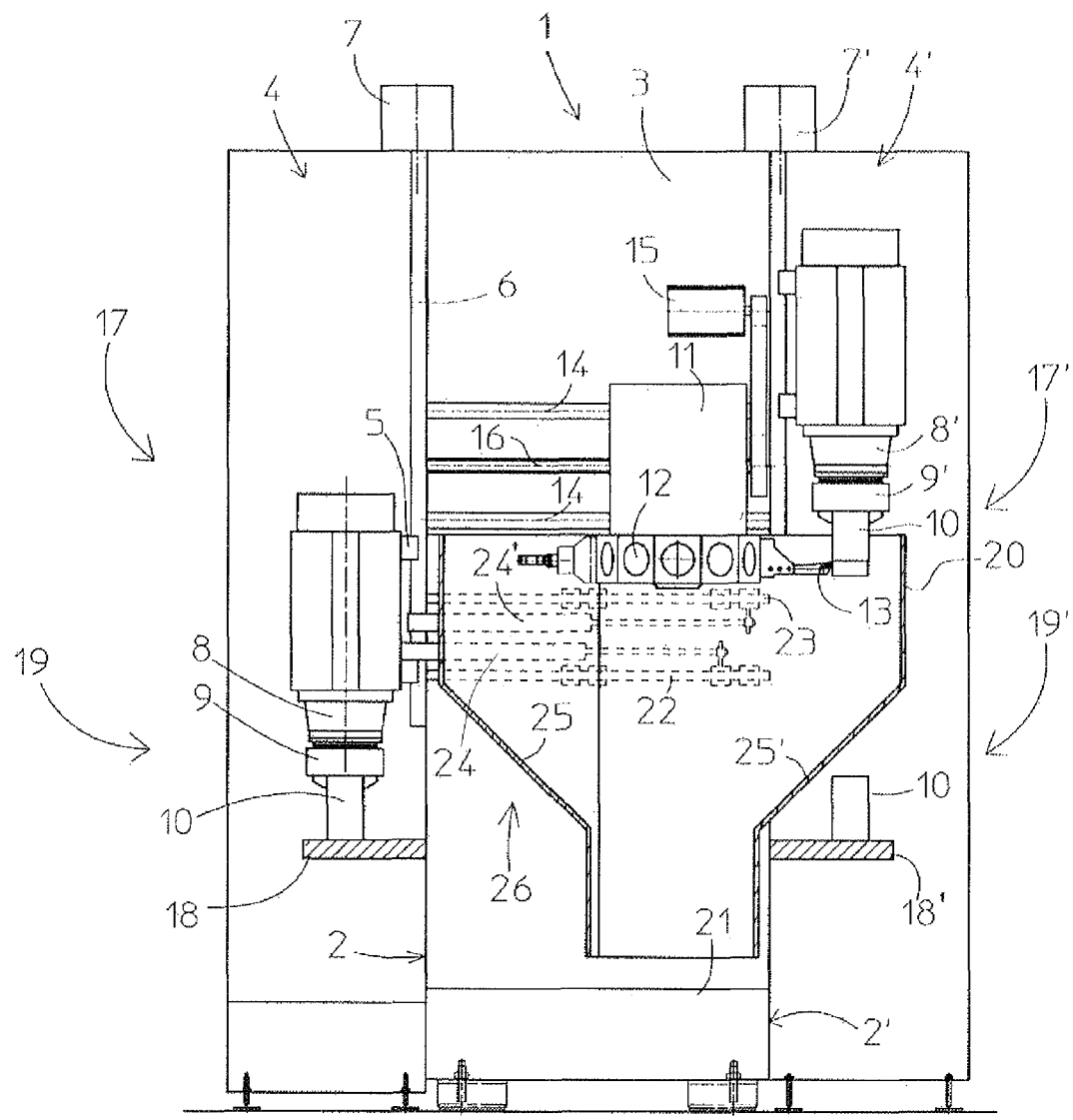
FIG. 3 shows the turning machine of FIG. 1 when loading the left-hand workpiece spindle.

FIG. 3 shows the turning machine after switching the machining side. The spindle 8' is again located in the machining station 17', while the tool holder 12 has been moved from the left side of the machine to the right side by moving along guide rails 14 in order to there machine a new workpiece 10. The deflector plate 25 has been moved to the right into its parked position 26 in order to load the spindle 8.

FIG. 4 is a side view of the turning machine. Here one sees the slide 4 that is able to move along the guides 6 on the side wall 2. The workpiece 10 in the spindle 8 is being machined by tools 13 of the tool holder 12 that is suspended behind it. The guard 20 is shown with its shoes rails 22 and 23.

I claim:

1. A machining apparatus comprising:
   a frame defining first and second upper machining stations horizontally offset from each other and respective first and second lower transfer stations underneath the first and second upper machining stations;
   respective first and second spindles having respective first and second workpiece grabs and displaceable vertically on the frame between upper positions with the respective first and second grabs in the respective first and second machining stations and lower positions with the respective first and second grabs in the respective first and second transfer stations;
   respective first and second workpiece conveyors extending through the first and second transfer stations for transporting workpieces into and out of the respective transfer stations so that the respective spindles can pick up unmachined workpieces from the respective transfer stations and set machined workpieces down in the respective transfer stations;
   a holder carrying tools and displaceable on the frame between the first and second machining stations so that while a workpiece is being machined by one of the tools in one of the machining stations a workpiece can be loaded into or unloaded from the grab of the spindle of the transfer station of the other of the machining stations;
   a chip deflector having first and second parts movable between respective catch positions underneath the respective first and second machining stations and respective parked positions not underneath the respective first and second machining stations such that, when the first and second parts are in their respective parked positions, the spindles are able to move vertically between the respective machining and transfer stations;
   a horizontal guide on the frame along which the first and second parts of the chip deflector can travel in a straight line to move between the respective catch and parked positions.

2. The machining apparatus defined in claim 1, further comprising
   a horizontal guide on the frame along which the holder is displaceable.

3. The machining apparatus defined in claim 1, further comprising
   respective first and second vertical guides on the frame and extending between a respective one of the first and second machining stations and the respective first and second transfer station, the first and second spindles being vertically shiftable along the respective first and second guides.

4. The machining apparatus defined in claim 1, wherein the horizontal guide is a rail along which-the parts of the chip deflector can travel.

5. The machining apparatus defined in claim 4, wherein the parts of the chip deflector define an upper edge below which one of the tools of the tool holder engages the workpiece during machining.

6. The machining apparatus defined in claim 1, wherein the parts of the chip deflector can telescope horizontally together on moving between the respective catch and parked positions.

7. The machining apparatus defined in claim 1, wherein each of the parts of the chip deflector includes
   an upper generally vertical wall,
   an intermediate wall portion forming an obtuse included angle with the respective upper wall and extending from a lower edge of the respective upper wall toward the other of the parts, and
   a lower wall extending downward from a lower edge of the respective intermediate wall portion.

8. The machining apparatus defined in claim 1, wherein each of the workpiece grabs of the spindles is a chuck adapted to grip one of the workpieces.

* * * * *